E. C. KETCHUM & D. H. ANDREWS.
DYNAMO ELECTRICAL MACHINE.
APPLICATION FILED APR. 25, 1912.

1,091,748.

Patented Mar. 31, 1914.

4 SHEETS—SHEET 1.

Witnesses:
N. C. Lombard
Edward H. Allen

Inventors:
Ernest C. Ketchum,
David H. Andrews,
by Walter E. Lombard,
Atty.

E. C. KETCHUM & D. H. ANDREWS.
DYNAMO ELECTRICAL MACHINE.
APPLICATION FILED APR. 25, 1912.

1,091,748.

Patented Mar. 31, 1914.

Witnesses:
Edward G. Allen.
N. C. Lombard

Inventors:
Ernest C. Ketchum,
David H. Andrews,
by Walter E. Lombard, Atty.

UNITED STATES PATENT OFFICE.

ERNEST C. KETCHUM, OF BOSTON, AND DAVID H. ANDREWS, OF NEWTON, MASSACHUSETTS.

DYNAMO-ELECTRICAL MACHINE.

1,091,748.  Specification of Letters Patent. Patented Mar. 31, 1914.

Application filed April 25, 1912. Serial No. 693,218.

*To all whom it may concern:*

Be it known that we, ERNEST C. KETCHUM, a citizen of the United States of America, and a resident of Boston, in the county of Suffolk and State of Massachusetts, and DAVID H. ANDREWS, a resident of Newton, in the county of Middlesex and State of Massachusetts, have invented certain new and useful Improvements in Dynamo-Electrical Machines, of which the following is a specification.

This invention relates to dynamo electrical machines and has for its object the provision of means whereby the armature will be equally balanced so that end thrust upon the bearings therefor will be entirely avoided.

The invention consists in mounting the cores for the field magnets beyond the periphery of the armature and revolving with said armature members forming parts of the field through which the lines of force from the cores of the field magnets will pass inwardly from either end of the armature to a separating member also revolving with said armature and from which the lines of force will return to the cores of the field magnets.

The invention further consists in certain novel features of construction and arrangement of parts which will be readily understood by reference to the description of the drawings and to the claims hereinafter given.

Figure 1:
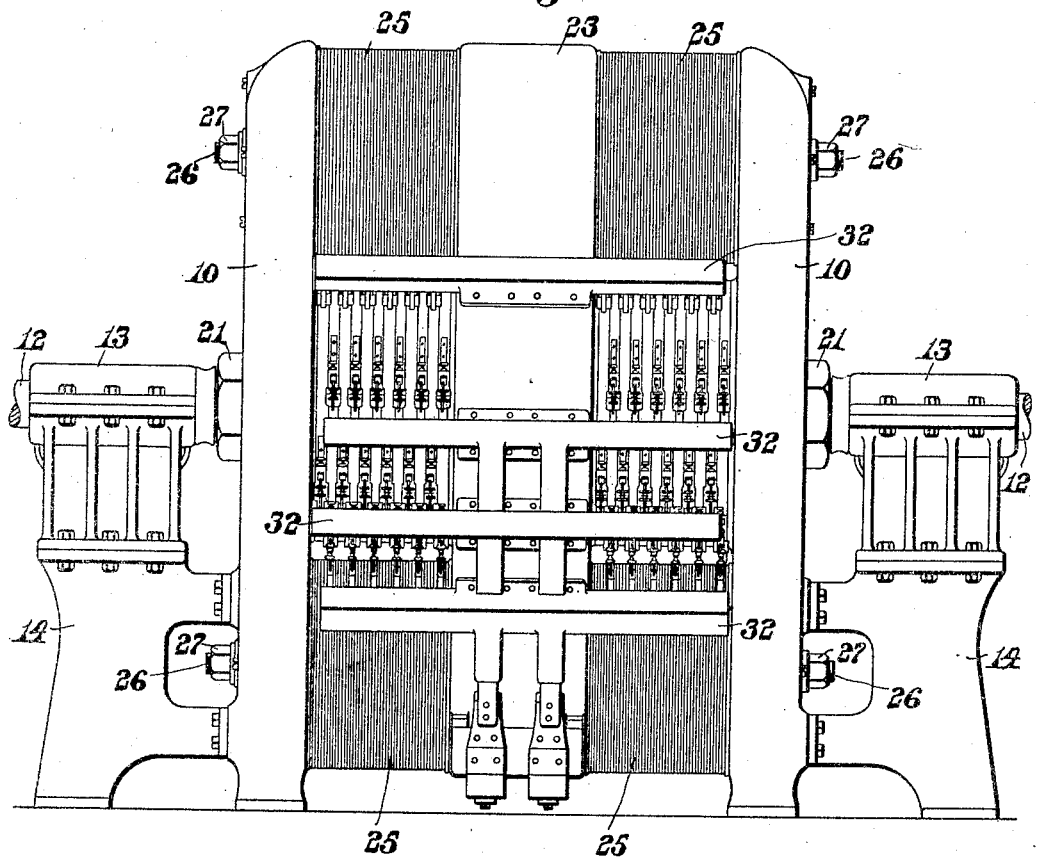
Figure 2:
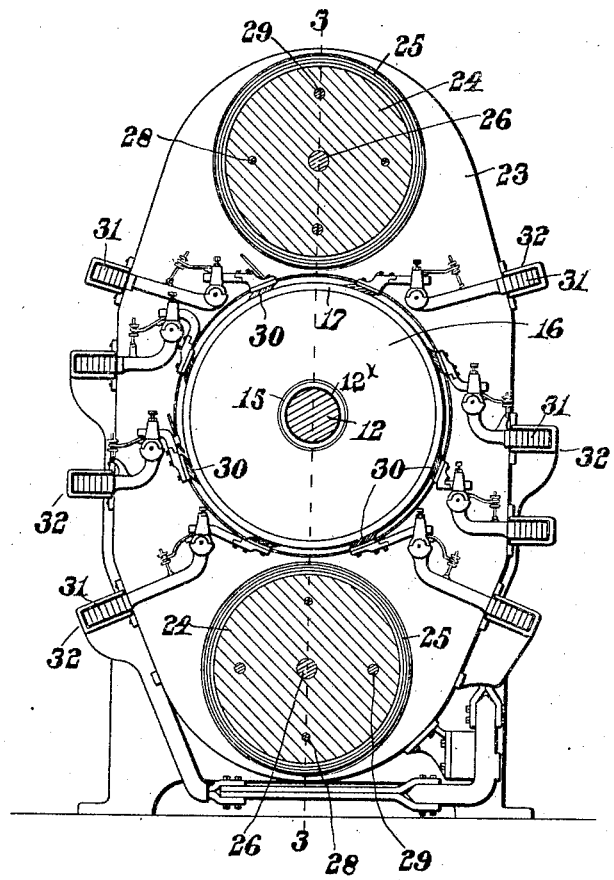
Figure 3:
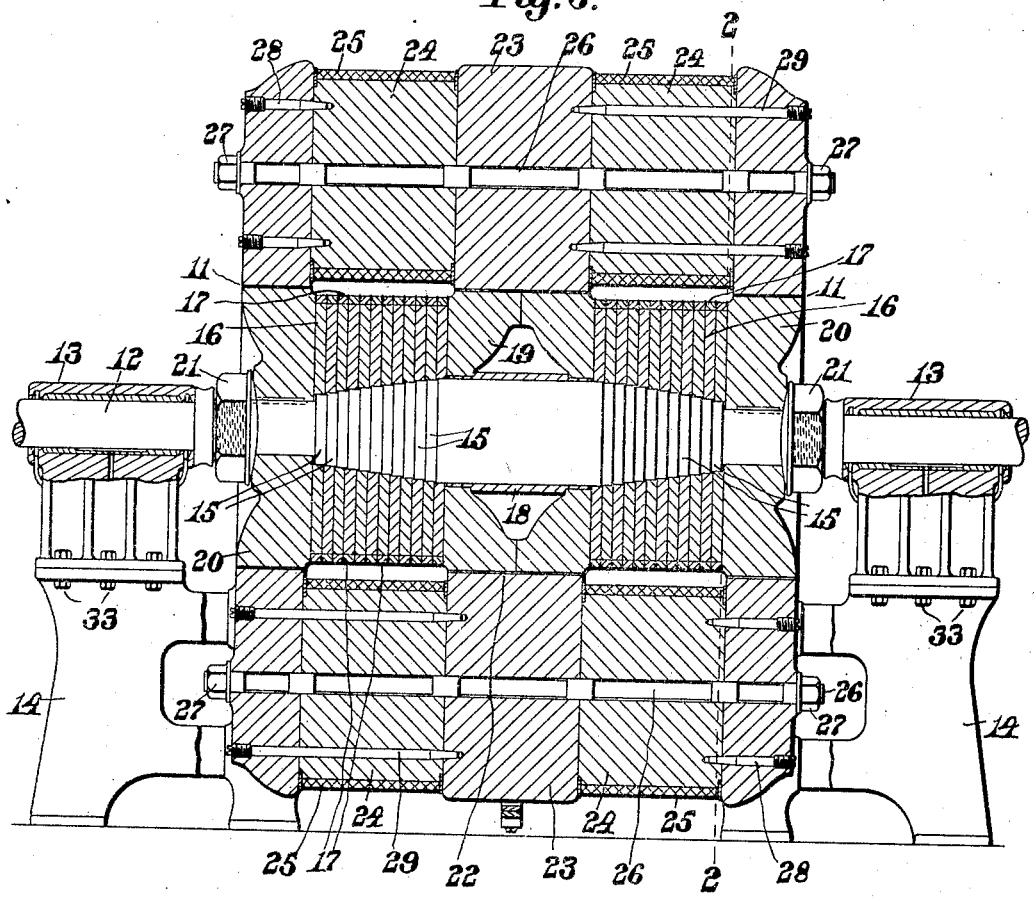
Figure 4:
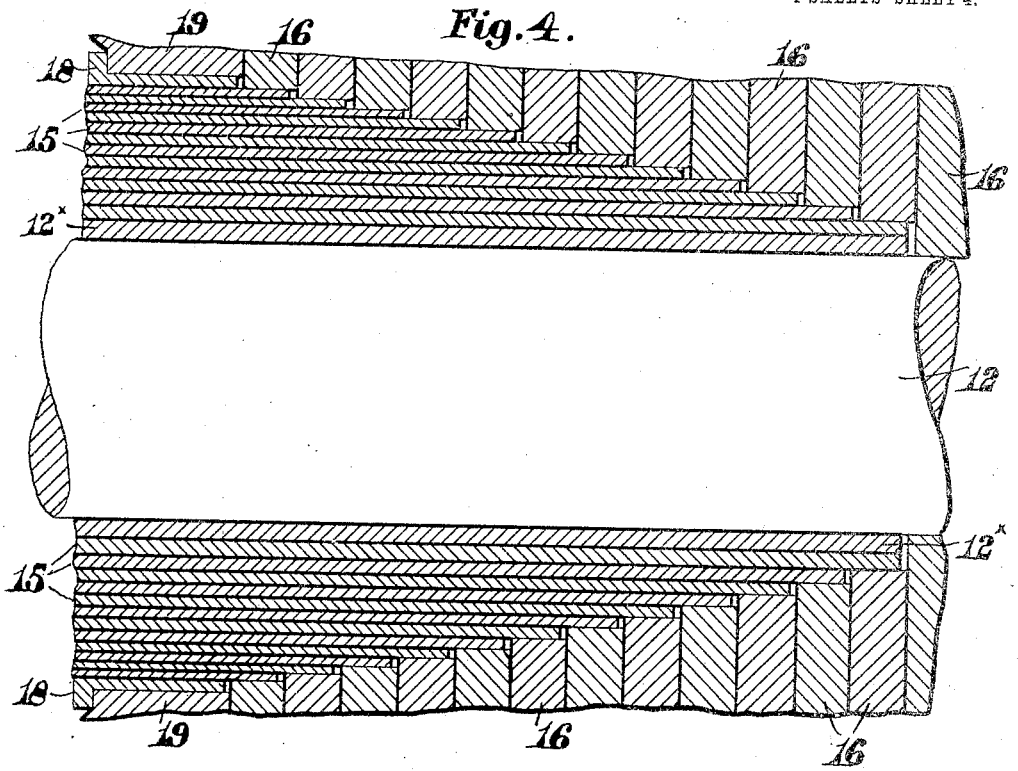
Figure 5:
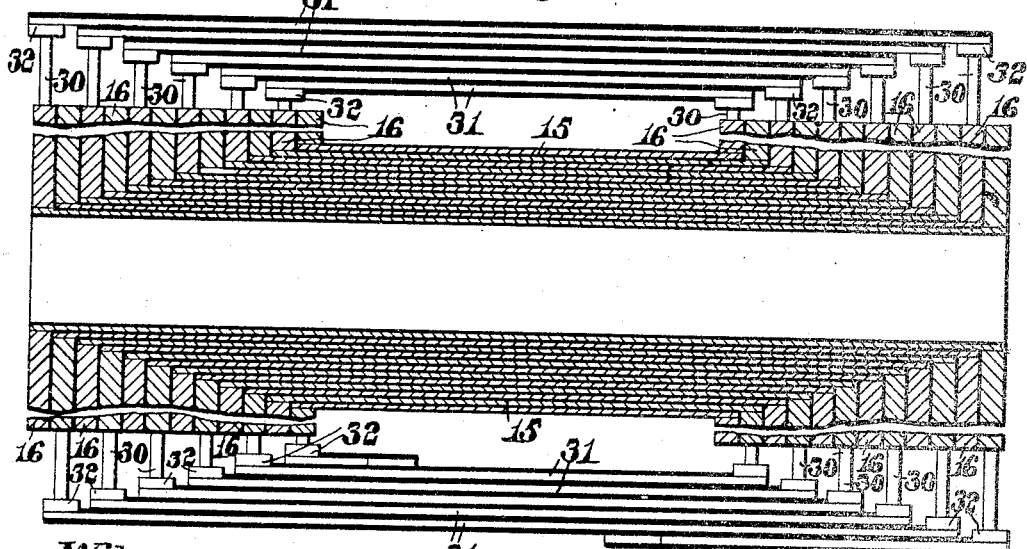

Of the drawings: Figure 1 represents an elevation of a dynamo electrical machine embodying the features of the present invention. Fig. 2 represents a transverse vertical section of the same, the cutting plane being on line 2—2 on Fig. 3. Fig. 3 represents a longitudinal vertical section of the same, the cutting plane being on line 3—3 on Fig. 2. Fig. 4 represents an enlarged sectional detail of a portion of the armature with its shaft in elevation, and Fig. 5 represents a diagram showing means for electrically connecting the various disks of the armature in pairs and other means of electrically connecting said disks in series.

Similar characters designate like parts throughout the several figures of the drawings.

In the drawings, 10 represents end pieces provided with cylindrical openings 11 therethrough. Substantially centrally positioned in the openings 11 is a shaft 12 revoluble in bearings 13 secured to frame 14 fastened to the outer faces of the end pieces 10. Surrounding the shaft 12 is a tubular support $12^x$ and mounted upon this support are a plurality of tubular members 15 superimposed upon each other, each succeeding member being shorter than the member it surrounds, as clearly indicated in Figs. 3 and 4 of the drawings. These tubular members are insulated from the shaft 12, the tubular support $12^x$, and from each other by any suitable material. Mounted upon the ends of each tubular member and in electrical contact therewith are the disks 16, each disk being preferably of steel and of high magnetic permeability, and each of said disks is provided with a peripheral band 17 of copper or some other material of high conductivity. The outer tubular member 15 is surrounded by a cylindrical member 18 which has mounted upon its periphery another cylindrical member 19 forming a part of the field frame and separating the disks 16 in two sets, the disks of said two sets being connected in pairs by the tubular members 15. The cylindrical member 19 is insulated from the disks 16 at each end thereof. Adjacent to the outer face of the outer disk 16 of each set and insulated therefrom is a cylindrical member 20 mounted upon the shaft 12 to which it is keyed so as to revolve therewith. Each disk 16 is insulated from those adjacent thereto by suitable insulating material as shown in heavy lines in Fig. 4 of the drawings. These two sets of disks 16, the separating member 19, and the outer cylindrical members 20, are all clamped together by means of the clamp nuts 21 threaded to the shaft 12 as shown in Fig. 3 of the drawings. The separating member 19 is cylindrical and is mounted in the cylindrical opening 22 in an intermediate member 23, this opening 22 being in alinement with the openings 11. The members 19 and 20 very nearly fill the openings 22 and 11 so that the peripheries of these members are closely adjacent to the walls of said openings 22 and 11. Interposed between the intermediate member 23 and each of the end pieces 10 are the cores 24 of field magnets, said cores being wound in the usual manner by wires 25 to form exciting coils. These cores are held in position by means of the rods 26 extending through the center thereof and through the intermediate member 23 and the end pieces 10, the ends of said rods having threaded thereto the clamp nuts 27. In order to secure together and preserve perfect alinement of the entire machine alternate short steady pins 28 and longer steady pins 29 extend through the end pieces 10 into the cores 24, the longer steady pins 29 extending through said cores and into the intermediate member 23. The cores 24 and exciting coils 25 are preferably positioned above and below the revoluble armature 16 with the axes thereof in the same vertical plane with the axes of the shaft 12, the revoluble members 20 forming a part of the field frame in the same manner that the cylindrical separating member 19 forms a part thereof, and as the armature 16 revolves these members revolve therewith.

The periphery of each disk 16 has contacting therewith four brushes 30 in electric contact with connecting bars 31 mounted in suitable boxes 32 secured to the intermediate member 23 whereby the disks 16 of the armature are connected in series substantially as shown and described in another application filed by us on January 31, 1912, Ser. No. 674,822. As this means of connecting the disks 16 in series forms no part of the present invention, it is believed to be unnecessary to describe the connection in detail, and consequently is only illustrated in diagram in Fig. 6. The revoluble members 19 and 20 are of greater diameter than the diameter of the copper rings 17 surrounding the disks 16, thereby providing a means whereby the armature and the revoluble members 19 and 22 may be removed from the remainder of the machine without dismantling any part thereof by simply removing the bearing 13 from the frame 14, this bearing 13 being secured to said frame 14 by means of the bolts 33. The tubular members 15 are made of different thicknesses, said tubular members decreasing in thickness outwardly so that the area in cross section of each of said tubular members is the same as that of each of the other tubular members. This provides a means whereby the same amount of current may pass through each of the tubular members from one disk to the companion disk in each pair. The brushes coacting with each disk 16 are substantially 90° apart, it having been found in practice that better results are obtained by so positioning the brushes throughout the periphery of said disks and thereby securing an even distribution of the current therethrough.

The supports 32 for the brush 30 are preferably made in two pieces and secured together by means of the bolt 35 so that the bar 34 may be removed any time it is desired to change the brush 30 without disconnecting the remainder of the brush holder. This brush 30 is made up of a plurality of bent plates 36 having interposed between the successive plates at one end shims 37. These shims 37 and the adjacent surfaces of the plates 36 are dipped in solder and then clamped together by means of a bolt 38 extending therethrough and having nuts 39 threaded thereon. The soldering of the various members together is then completed by the application of heat in any well-known manner. This makes a solid end for the brush from which project the yielding bent ends of the plates 36 which contact with the surface of the disks 16 or the periphery of the copper band thereon. This brush thus constructed is secured to the member 34 by means of bolts 40 the ends of which are threaded to the solid portion of the brush. By having the cores 24 of the field magnets above and below the armature 16, ample opportunity is afforded for properly positioning the brushes 30 co-acting with the armature disks 16 so that they may be equally spaced about the peripheries of the disks 16, it having been found in practice that superior results are obtained by the equal spacing of these brushes about the peripheries. The cores 24 are so wound that like poles are produced at the two end frames. It is obvious, from an inspection of the drawings, that the members 19 and 20 form a part of the field circuit and as the armature revolves the magnetic flux will pass from the cores 24 of the field magnets through the end pieces 10, the members 20, and then through the disks 16 of the armature from which they pass through the member 19 and the separating member 23 back to the cores 24. It is obvious, therefore, that as the armature 16 revolves the lines of force will be continually cut by successive portions of the armature disks as they rotate about the axis of the shaft 12. As the magnetic flux from the two pairs of cores 24 passes through the armature disks 16 toward the separating member 19 the magnetic pull caused thereby tends to clamp the various armature disks 16, the separating members 19, and the end members 20 solidly together and all of the revoluble members are so balanced that there is absolutely no end thrust upon the bearings 13 for the revoluble shaft 12. This forms a most important feature of the present invention, the advantages of which will be apparent without further description. By providing the end pieces 10 with the openings 11 and mounting the revoluble members 20 therein the whole machine is shortened materially so as to occupy less floor space, and by so doing it is possible to locate the bearings 13 for the revoluble shaft outside of the boundaries of the machine proper where they are easily accessible. By locating the axis of the shaft 12 slightly above the axis of the openings 11, through the end pieces 10, a greater amount of magnetism passes through the upper portion of the armature 16 as it revolves so that a large portion of the weight thereof is sustained, thereby removing considerable of the weight upon the bearings 13 in which the shaft 12 revolves. It is obvious that on account of the construction of this machine the magnetic pull upon the various parts when the machine is in operation is such as to hold the various portions of the machine together so that the numerous holding devices ordinarily used are entirely dispensed with.

It is self-evident that the working parts of the armature in the present construction when in operation always move in a plane at right angles to the lines of force and are constantly cutting the same without producing any reversal of the current or change of polarity in the armature. This obviates the eddy currents and other losses which are frequent in other types of dynamos. Inasmuch as in the armature wires are entirely dispensed with, the armature is permitted to revolve at a high velocity without endangering the displacement of any of the elements thereof. The polarity of the armature is constant and unchanging, and consequently the flow of flux thereto from the positive poles of the field magnet is always producing on either end of said armature an equal stress, resulting in a perfectly balanced armature, which obviously is of the greatest advantage in a machine of this type, where, in order to secure effective results it is essential the armature be revolved at a greater velocity than has heretofore been believed possible. By the construction shown in the drawings a most powerful generator of electricity is produced, which is capable of being driven direct by turbine engines and other high speed motors.

It is believed that the operation and many advantages of the invention will be fully understood from the foregoing.

Having thus described our invention, we claim:

1. In the rotatable member of a dynamo electrical machine, the combination of a shaft; two sets of metal disks thereon; insulation between said disks; tubular members connecting the disks of said two sets in pairs; other means for electrically connecting said disks of the two sets in series; and members secured to and revoluble with said shaft and between which said disks are permanently clamped.

2. In the rotatable member of a dynamo electrical machine, the combination of a shaft; two sets of metal disks thereon; insulators between said disks; tubular members connecting the disks of said two sets in pairs; other means for electrically connecting said disks of the two sets in series; and members extending beyond the peripheries of said disks secured to and between which said disks are permanently clamped.

3. In the rotatable member of a dynamo electrical machine, the combination of a shaft; two sets of metal disks thereon; insulation between said disks; tubular members connecting the disks of said two sets in pairs; other means for electrically connecting said disks of the two sets in series; and cylindrical members secured to and revoluble with said shaft and between which said disks are permanently clamped.

4. In the rotatable member of a dynamo electrical machine, the combination of a shaft; two sets of metal disks thereon; insulation between said disks; tubular members connecting the disks of said two sets in pairs; other means for electrically connecting said disks of the two sets in series; and cylindrical members extending beyond the peripheries of said disks secured to and revoluble with said shaft and between which said disks are permanently clamped.

5. In the rotatable member of a dynamo electrical machine, the combination of a shaft; two sets of metal disks thereon; insulation between said disks; tubular members connecting the disks of said two sets in pairs; other means for electrically connecting said disks of the two sets in series; a separating cylinder between and insulated from said sets of disks and surrounding said shaft; and members contacting with and insulated from the outer end faces of said two sets of disks and revoluble with said shaft.

6. In the rotatable member of a dynamo electrical machine, the combination of a shaft; two sets of metal disks thereon; insulation between said disks; tubular members connecting the disks of said two sets in pairs; other means for electrically connecting said disks of the two sets in series; a separating cylinder between and insulated from said sets of disks and surrounding said shaft; and members contacting with and insulated from the outer end faces of said two sets of disks and revoluble with said shaft, said members and separating cylinders having their peripheries beyond the peripheries of said disks.

7. In a dynamo electrical machine, the combination of a field magnet having a plurality of exciting coils; a revoluble shaft parallel to the axis of said exciting coils and at one side thereof; and an armature comprising a plurality of separated disks mounted on said shaft with its periphery in close proximity to the poles of said field magnet.

8. In a dynamo electrical machine, the combination of a field magnet having two sets of exciting coils the axes of which are parallel and separated; a shaft interposed between said sets of exciting coils and revoluble in bearings; and an armature comprising a plurality of separated disks secured to and revoluble with said shaft with its periphery adjacent the poles of said field magnets.

9. In a dynamo electrical machine, the combination of two end pieces provided with alined openings therein; a field magnet interposed between and secured to said end pieces including two sets of exciting coils on opposite sides of said openings; a revoluble shaft centrally positioned in said openings; and an armature thereon.

10. In a dynamo electrical machine, the combination of two end pieces provided with alined openings therein; a field magnet interposed between and secured to said end pieces including two sets of exciting coils on opposite sides of said openings; a revoluble shaft centrally positioned in said openings; and an armature thereon comprising a plurality of separated metal disks connected together in pairs by members revoluble therewith and in series by external connections.

11. In a dynamo electrical machine, the combination of two end pieces provided with alined openings therein; a field magnet interposed between and secured to said end pieces including two sets of exciting coils on opposite sides of said openings; a revoluble shaft centrally positioned in said openings; cylindrical members on said shaft positioned within said openings with their peripheries adjacent to the walls thereof; and an armature on said shaft between said members.

12. In a dynamo electrical machine, the combination of two end pieces provided with alined openings therein; a field magnet interposed between and secured to said end pieces including two sets of exciting coils on opposite sides of said openings; a revoluble shaft centrally positioned in said openings; cylindrical members on said shaft positioned within said openings with their peripheries adjacent to the walls thereof; and an armature comprising a plurality of separated disks on said shaft between said members.

13. In a dynamo electrical machine, the combination of two end pieces provided with alined openings therein; a field magnet interposed between and secured to said end pieces including two sets of exciting coils on opposite sides of said openings; a revoluble shaft centrally positioned in said openings; cylindrical members on said shaft positioned within said openings with their peripheries adjacent to the walls thereof; and an armature comprising a plurality of separated disks of high magnetic permeability on said shaft between said members.

14. In a dynamo electrical machine, the combination of two end pieces provided with alined openings therein; a field magnet interposed between and secured to said end pieces including two sets of exciting coils on opposite sides of said openings; a revoluble shaft centrally positioned in said openings; cylindrical members on said shaft positioned within said openings with their peripheries adjacent to the walls thereof; an armature comprising a plurality of separated disks; and means for clamping said members and said disks together.

15. In a dynamo electrical machine, the combination of two end pieces and an intermediate member all provided with alined openings; a field magnet having two sets of exciting coils on opposite sides of said openings positioned between said intermediate member and end members; a revoluble shaft centrally positioned in said openings; cylindrical members secured to and revoluble therewith within said openings with their peripheries adjacent to the walls thereof; separated disks in two sets surrounding said shaft between said revoluble members, the disks of the two sets being connected in pairs by members revoluble with said shaft and in series by external connections.

16. In a dynamo electrical machine, the combination of two end pieces and an intermediate member all provided with alined openings; field magnet having two sets of exciting coils on opposite sides of said openings positioned between said intermediate member and end members; a revoluble shaft centrally positioned in said openings; cylindrical members secured to and revoluble therewith within said openings with their peripheries adjacent to the walls thereof; separated disks in two sets surrounding said shaft between said revoluble members, the disks of the two sets being connected in pairs by members revoluble with said shaft and in series by external connections; and means for securing said field magnets to said end pieces and intermediate member.

17. In a dynamo electrical machine, the combination of a field magnet including two sets of exciting coils and an armature comprising a plurality of separated disks revoluble with a shaft interposed between said coils with its axis parallel to the axis of said coils.

18. In a dynamo electrical machine, the combination of a field magnet including two sets of exciting coils; a revoluble armature interposed between said coils; and members forming a part of the field frame revoluble with said armature.

19. In a dynamo electrical machine, the combination of a field magnet including two sets of exciting coils; a revoluble armature; and members revoluble with said armature forming a part of the field frame.

20. In the rotatable member of a dynamo electrical machine, the combination of a shaft; two sets of metal disks thereon; insulation between said disks; tubular members connecting the disks of two sets in pairs, said tubular members having substantially the same area in cross section; and other means for electrically connecting said disks in series.

21. In the rotatable member of a dynamo electrical machine, the combination of a shaft; two sets of metal disks thereon; insulation between said disks; tubular members connecting the disks of two sets in pairs, the thickness of said tubular members gradually decreasing outwardly; and other means for electrically connecting said disks in series.

22. In a dynamo electrical machine, the combination of a field magnet; a revoluble armature; members forming portions of the field secured to and revoluble with said armature; and bearings for said revoluble armature beyond the limits of said field magnets.

Signed by us at 4 Post Office Sq., Boston, Mass., this 22nd day of April, 1912.

ERNEST C. KETCHUM.
DAVID H. ANDREWS.

Witnesses:
WALTER E. LOMBARD,
NATHAN C. LOMBARD.